April 20, 1954  F. K. KNOHL  2,675,844
LOCK WASHER
Filed April 23, 1952
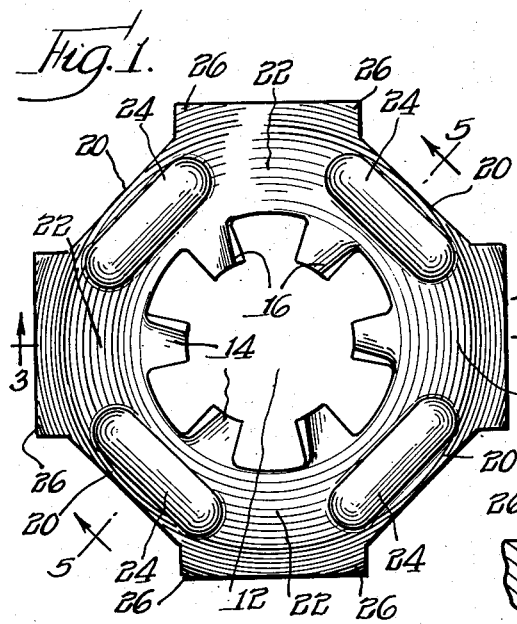
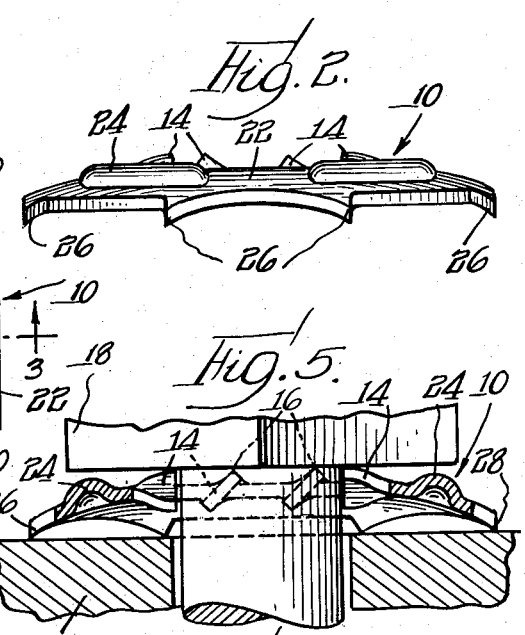
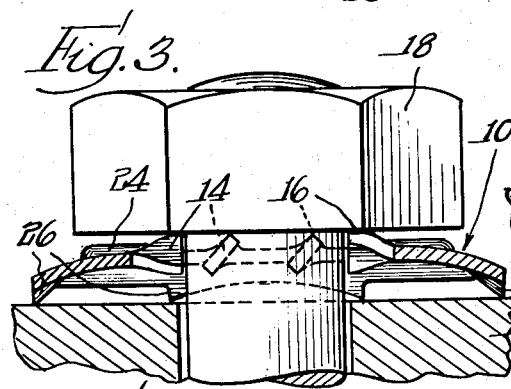
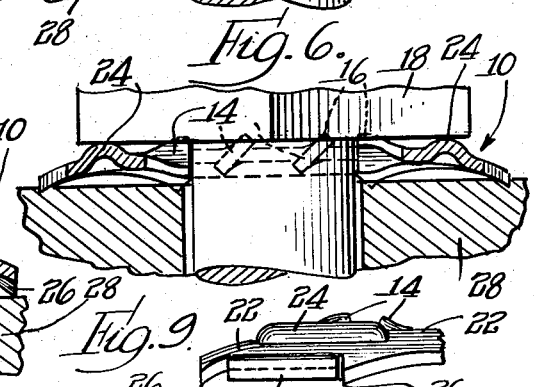
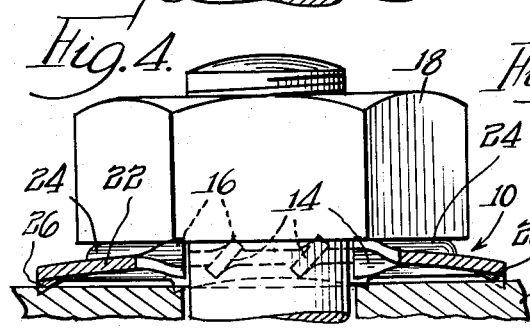
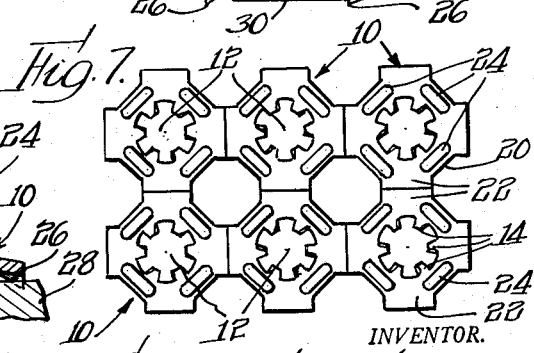
INVENTOR.
Friedrich Karl Knohl
BY
Moore, Olstad & Trexler
attys.

Patented Apr. 20, 1954

2,675,844

UNITED STATES PATENT OFFICE 2,675,844

LOCK WASHER

Friedrich Karl Knohl, Chicago, Ill., assignor to Illinois Tool Works, Chicago, Ill., a corporation of Illinois Application April 23, 1952, Serial No. 283,946

7 Claims. (Cl. 151—35)

This invention relates generally to lock washers and more particularly to lock washers of the dished type, wherein the inner annular margin is adapted to be engaged by a clamping nut or screw head and the outer margin is designed to lockingly engage a complementary work surface.

Washers of the dished type have a very practical application in instances where considerable axial flexing of the locking part is desired. For example, in instances where considerable bolt stretch is encountered, a lock washer must be used which will accommodate itself to this variation. Likewise, it is not uncommon in applications where a heavy duty washer is required to employ a dished washer of considerable thickness. It is one of the important objects of the present invention to provide a new and improved dished lock washer having improved locking characteristics, as well as a washer which will cost considerably less than washers heretofore available for the same purpose.

More specifically the invention contemplates a lock washer of the type referred to above, wherein the flexibility of the outer marginal locking sections of the washer is enhanced without impairing the required body rigidity extending between said sections.

It is a further object of the present invention to produce a dished type lock washer as above referred to, wherein relatively thin sheet metal stock may be employed so as to afford the required flexibility of the locking sections along the outer margin of the washer, coupled with strengthened sheet metal stock extending between said sections designed to increase resistance to clamping forces acting against the washer.

The foregoing and other objects and advantages will be more apparent from the following detailed description, when considered in connection with the accompanying drawing, wherein—

Fig. 1 is a plan view of a dished lock washer which is representative of one embodiment of the present invention;

Fig. 2 is a front elevational view of the lock washer shown in Fig. 1;

Fig. 3 discloses the washer of Fig. 1 in central cross-section along the line 3—3 of Fig. 1 positioned between a clamping surface of a rotary threaded fastener such as a nut and a work surface just prior to the tightening of the nut against the washer;

Fig. 4 is a view similar to Fig. 3 after the nut has been tightened against the washer;

Fig. 5 is a view similar to Fig. 3 disclosing a cross-sectional view of the lock washer taken substantially along the line 5—5 of Fig. 1;

Fig. 6 is a view similar to Fig. 5, disclosing the washer clamped against the work surface;

Fig. 7 is a fragmentary view of the washer stock in strip form from which the washers of the present invention may be very economically produced;

Fig. 8 is a fragmentary plan view similar to Fig. 1, showing a slightly modified form of washer equipped with a strengthening flange in the vicinity of the ribs or bosses; and Fig. 9 is a fragmentary perspective edge view of the washer of Fig. 8.

Referring now to the drawing more in detail, wherein like numerals have been employed to designate similar parts throughout the various figures, it will be seen that one embodiment of the invention contemplates a lock washer designated generally by the numeral 10. This lock washer 10 is provided with a central aperture 12 defined by a plurality of circumferentially spaced locking prongs 14 extending radially inwardly from the inner margin of the washer body. In the disclosed embodiment these prongs 14 are so deflected or twisted as to present locking teeth 16 adapted for clamping engagement by a rotary threaded fastener, such as the nut 18 shown in Figs. 3 to 6, inclusive. These teeth 16 normally project axially beyond the upper limits of the washer body in position to be engaged by the clamping surface of a nut or screw head.

The washer body which suports the prongs 14 includes circumferentially spaced relatively rigid sections 20 which are separated by relatively resilient or yieldable sections 22. The sections 20 are relatively rigid by reason of the strengthening ribs or bosses 24 which extend tangentially with respect to a circle concentric with the washer axis. In other words, these strengthening ribs or bosses 24 extend generally in a circumferential direction along the washer body. By reason of the presence of the ribs 24, the circumferential extent of the washer body determined by the length of these ribs is relatively rigid, as distinguished from the body sections 22 extending between each pair of ribs.

The washer body sections 22 form a portion of what might be called an outer marginal locking section of the washer, each of such sections including a pair of circumferentially spaced axially deflected teeth 26 provided at the opposed corners of radially extending lugs. These teeth 26 are designed for locking engagement with a complementary work surface such as the surface of a work piece 28 shown in the drawings. It will be noted that in cross-section taken along the line 3—3 of Fig. 1, as well as in cross-section taken along the line 5—5 of Fig. 1, the washer body is generally dished so as to permit considerable axial deflection when a clamping member such as the nut 18 is tightened from the position shown in Fig. 3 or 5 to the position shown in Fig. 4 or 6, respectively. It is of the utmost importance that the body portions 22 be resilient because of their intimate association with the locking teeth 26. Thus, when the washer is reclamped in position, the resiliency of the body portion 22 cooperates with the aggressive biting action of the teeth 26 to assure a firm spring grip over the entire range of axial flexure of the washer.

It is of importance to note that while the body portions 22 contribute the required yieldability to enhance the efficiency of the locking teeth, the remaining areas of the washer body including the circumferentially extending bosses 22 are sufficiently rigid to lend the firm and effective resistance to clamping forces exerted against the washer. This arrangement makes it possible to employ relatively light gauge washer stock in order to obtain the required degree of flexibility in the washer body areas 22, and at the same time maintain the required resistance to the clamping action of the nut in the body sections or areas 20. Were it not for the presence of the circumferentially extending ribs 24, it would not be possible to employ the relatively light gauge readily flexible washer stock. Not only does the use of lighter gauge sheet metal washer stock contribute to the flexibilty in circumferentially spaced areas of the washer body, but it also makes possible considerable saving in cost of manufacture. Heretofore, washers of this dished type were made of relatively heavy gauge stock in order to withstand severe load conditions, and obviously this stock of heavier gauge is considerably more expensive than lighter gauge material. Hence, the present invention not only makes possible a more efficiently operable dished type lock washer, but also contributes materially to savings in cost of manufacture.

It will also be apparent from the disclosure in Figs. 4 and 6 that the strengthening ribs 24 are designed to serve as abutments against which the clamping surface of the nut 18 may bear when the washer is finally tightened to the positions shown in Figs. 4 and 6. In this manner the ribs or bosses 24 cooperate to prevent complete flattening or untwisting of the washer prongs 14.

In instances where increased rigidity is required in the area occupied by the ribs or bosses 24, flanges 30 are formed along the margin of the washer as shown in Figs. 8 and 9. These flanges depend from each washer margin adjacent a complementary boss 24. The flanges 30 cooperate with the bosses 24 in lending increased rigidity to the washer stock in that area.

By having the external periphery of the washers shaped in accordance with the teachings of the present invention, the ease with which the washers may be formed and stamped from sheet metal strip stock is greatly facilitated. In this connection specific reference is made to the disclosure in Fig. 7 showing a fragmentary view of the washer stock in strip form from which each of the washer members 10 may be produced. By employing the straight line severance between peripheral contacting areas of the washer members, greater tool life is experienced.

From the foregoing it will be apparent that the present invention contemplates a novel and commercially desirable dished type lock washer. Considerable savings result from the use of lighter gauge material, and this lighter gauge material contributes materially to the resilient functioning of the external lock washer teeth. Likewise, the remaining portions of the washer body requiring greater resistance to clamping forces are strengthened by the circumferentially or tangentially extending ribs. As heretofore set forth, these ribs not only serve to increase resistance to clamping forces, but also provide firm abutments when the washer is flattened to a considerable degree, thereby preventing complete untwisting or flattening of the internal washer teeth.

While for purposes of disclosure certain specific embodiments of the invention have been shown in the drawings, it will be apparent that the invention is capable of other modifications and changes without departing from the spirit and scope of the appended claims.

The invention is hereby claimed as follows:

1. A lock washer having an annular dished body, the concave side thereof being adapted for application to a work surface, inner teeth carried by the inner margins of the body for lockingly engaging the clamping side of a screw head or nut, circumferentially spaced outer teeth projecting radially outwardly from the outer margin of the body for lockingly engaging a complementary work surface, a plurality of circumferentially spaced ribs on said body located between the inner and outer margins thereof and of sufficient elongation in a generally peripheral direction to substantially traverse the space between adjacent radially projecting outer teeth for increasing the strength of the body in that vicinity to resist forces tending to flatten the body, the adjacent ends of adjacent ribs being spaced apart and terminating substantially in the vicinity of corresponding radial margins of said outer teeth and the portions of the body extending between adjacent spaced rib ends being yieldable and positioned adjacent complementary outer marginal teeth to enhance flexibility in the vicinity thereof whereby to increase the locking effectiveness of the washer.

2. A lock washer in accordance with claim 1, wherein the strengthening ribs are not less than three in number and are uniformly distributed around the washer body.

3. A lock washer in accordance with claim 1, wherein the circumferentially spaced ribs project axially beyond the convex side of the body to provide an abutment for the clamping side of a screw head or nut after the dished body has been flattened to an extent predetermined by the distance to which said ribs project axially.

4. A lock washer in accordance with claim 1, wherein the outer circumferentially spaced teeth are provided at the opposed corners of circumferentially spaced lug portions projecting radially outwardly from the washer body.

5. A lock washer in accordance with claim 4, wherein the outer edge of each lug portion extending circumferentially between each pair of teeth defines a straight line.

6. A lock washer in accordance with claim 1, wherein each yieldable body portion is complemental to a pair of outer marginal circumferentially spaced teeth.

7. A lock washer in accordance with claim 1, wherein a marginal flange is provided in the vicinity of each rib between adjacent outer teeth to lend increased rigidity in that area of the washer.

References Cited in the file of this patent

UNITED STATES PATENTS

| Number | Name | Date |
|---|---|---|
| 1,726,972 | Zinnbauer | Sept. 3, 1929 |
| 1,911,384 | Olson | May 30, 1933 |
| 2,191,101 | Stellin | Feb. 20, 1940 |